US007206194B2

(12) United States Patent
Garner et al.

(10) Patent No.: US 7,206,194 B2
(45) Date of Patent: Apr. 17, 2007

(54) MECHANISM FOR SELF-ALIGNMENT OF COMMUNICATIONS ELEMENTS IN A MODULAR ELECTRONIC SYSTEM

(75) Inventors: Robert Barton Garner, San Jose, CA (US); Winfried Wolfgang Wilcke, Los Altos Hills, CA (US); Richard Michael Williams, Kelso, WA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 10/987,901

(22) Filed: Nov. 12, 2004

(65) Prior Publication Data

US 2006/0104011 A1 May 18, 2006

(51) Int. Cl.
*H05K 5/00* (2006.01)

(52) U.S. Cl. ...................................... 361/679; 361/685

(58) Field of Classification Search ................ 361/679, 361/683, 686

See application file for complete search history.

(56) References Cited

U.S. PATENT DOCUMENTS 5,602,721 A * 2/1997 Slade et al. ................. 361/727
6,144,888 A * 11/2000 Lucas et al. .................. 700/83
6,661,648 B2 * 12/2003 Dayley ....................... 361/683
2005/0104011 A1 * 5/2005 Schindlbeck et al. .... 250/485.1

* cited by examiner

*Primary Examiner*—Yean-Hsi Chang
(74) *Attorney, Agent, or Firm*—Samuel A. Kassatly

(57) ABSTRACT

A mechanism that automatically achieves alignment of the communications elements during assembly of a modular computer system, without the need for human intervention. The mechanism comprises an alignment frame provided with bumps and depressions. The bumps in the alignment frames mate with the depressions on adjacent alignment frames. Each depression comprises an entrance opening that is wider than the diameter of the bumps. The diameter of the entrance opening is determined by the expected accuracy of the alignment of subsystems or bricks within the modular electronic system. When it is desired to align the communication elements, the alignment frames are brought into engagement by causing alignment guides to slide past each other, and to guide the bumps in the alignment frames into the depressions in the adjacent alignment frames. The mechanism further comprises a set of springs that force the allow the alignment frames to be retained securely by the communications elements.

10 Claims, 8 Drawing Sheets

MECHANISM FOR SELF-ALIGNMENT OF COMMUNICATIONS ELEMENTS IN A MODULAR ELECTRONIC SYSTEM

FIELD OF THE INVENTION

The present invention generally relates to computer systems, and more particularly to a scalable computer comprising communications elements each having capacitive couplers or other wireless communication devices mounted on subsystem surfaces for communication with adjacent subsystems. More specifically, the present invention pertains to a mechanism for automatically achieving self-alignment between subsystems or communications elements with sufficient accuracy.

BACKGROUND OF THE INVENTION

Contemporary computer and communications systems commonly comprise several subsystems, each implementing one or more computation or communication functions. Examples include computer servers, Internet web servers, storage servers, and packet-based communications switches. Each subsystem comprises its unique electrical and mechanical elements, including printed-circuit wiring board assemblies, internal wiring and connectors, etc. Each subsystem is outfitted with external connector sockets for communicating with other subsystems and for drawing power. The subsystems are mounted in close proximity to each other in mechanical structures in the form of industry-standard-sized racks or custom-sized chassis, referenced as rack/chassis-based architecture.

The rack/chassis-based architecture has several advantages: the subsystems may be arbitrarily arranged in the room, subject to cooling and cabling distance constraints, and the subsystems may have different form factors. Although this technology has proven to be useful, it would be desirable to present additional improvements. The rack/chassis-based architecture suffers from several operational disadvantages: scaling difficulty; cable management; connector unreliability; and unreliability of wire and cable assemblies. These disadvantages contribute to the overall unreliability of today's high-performance computer and communications systems and lead to increased costs of ownership, maintenance, and upgrade of the systems.

A modular computer system is a reliable alternative to the rack/chassis-based architecture. The modular computer system utilizes non-cable interconnections and is easy to expand and service. The modular computer system comprises discrete subsystems, building blocks, or "bricks", arranged together such that adjacent subsystems communicate with each other via surface-mounted communication elements such as capacitive couplers located on the subsystem surfaces. The subsystems may be arranged into a one-dimensional, two-dimensional, or three-dimensional structure to perform general-purpose computing, data storage, and network communications, or a combination of such functions. Each building block comprises transmitting elements and receiving elements.

The building blocks are in close proximity. Information is exchanged using a wireless communication medium such as, for example, electromagnetic carrier waves. The electromagnetic carrier waves may be transmitted, for example, in the optical or radiofrequency domain using time-varying electric or magnetic fields varying at base band frequency.

Transmission techniques utilized by modular computer systems require relatively precise alignment between the transmitting elements and receiving elements of the building blocks. Generally, alignment between the transmitting elements and receiving elements is required in a range from a few microns to a few hundred microns precision. However, the building blocks might not necessarily be aligned to the precision required for transmission between the transmitting elements and the receiving elements.

What is therefore needed is a mechanism for automatically achieving sufficient accuracy of the alignment between the transmission elements and the receiving elements without the need for human intervention. The need for such a system has heretofore remained unsatisfied.

SUMMARY OF THE INVENTION

The present invention satisfies this need, and presents a mechanism and an associated method (collectively referred to herein as "the mechanism" or "the present mechanism") for achieving sufficient accuracy of the alignment between transmitting elements and receiving elements (collectively referenced as communications elements) of building blocks used by a modular computer system. The present mechanism automatically achieves alignment of the communications elements during assembly of the modular computer system, without the need for human intervention. The present mechanism achieves alignment of communications elements even in cases where a building block is inserted into a "hole" in the modular computer system.

The present mechanism comprises an alignment frame that is provided with bumps and depressions (or holes). The bumps in the alignment frames mate with the holes on adjacent alignment frames. Each of the holes comprises an entrance opening that is wider than the diameter of the bumps. The diameter of the opening is determined by the expected accuracy of the alignment of subsystems within the modular electronic system. The diameter of the opening is chosen such that the bumps are guaranteed to intercept the holes as the subsystems are brought into contact. The depth of the holes is approximately equal to the radius of the bumps.

The alignment frame is installed in a side of a brick through a cutout in a side or wall of the brick. The cutout is slightly larger than the alignment frame, allowing the alignment frame to shift within the cutout to allow alignment with the adjacent alignment frame. The present mechanism further comprises a set of springs to push the alignment frame against the wall of the brick. The springs allow movement of the alignment frame against the brick, further aiding in precise alignment of the communications elements. The alignment frame further comprises rounded or sloped edges, allowing the alignment frame to slide past an adjacent alignment frame as a brick is installed into the modular electronics system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figures 1A, 1B:
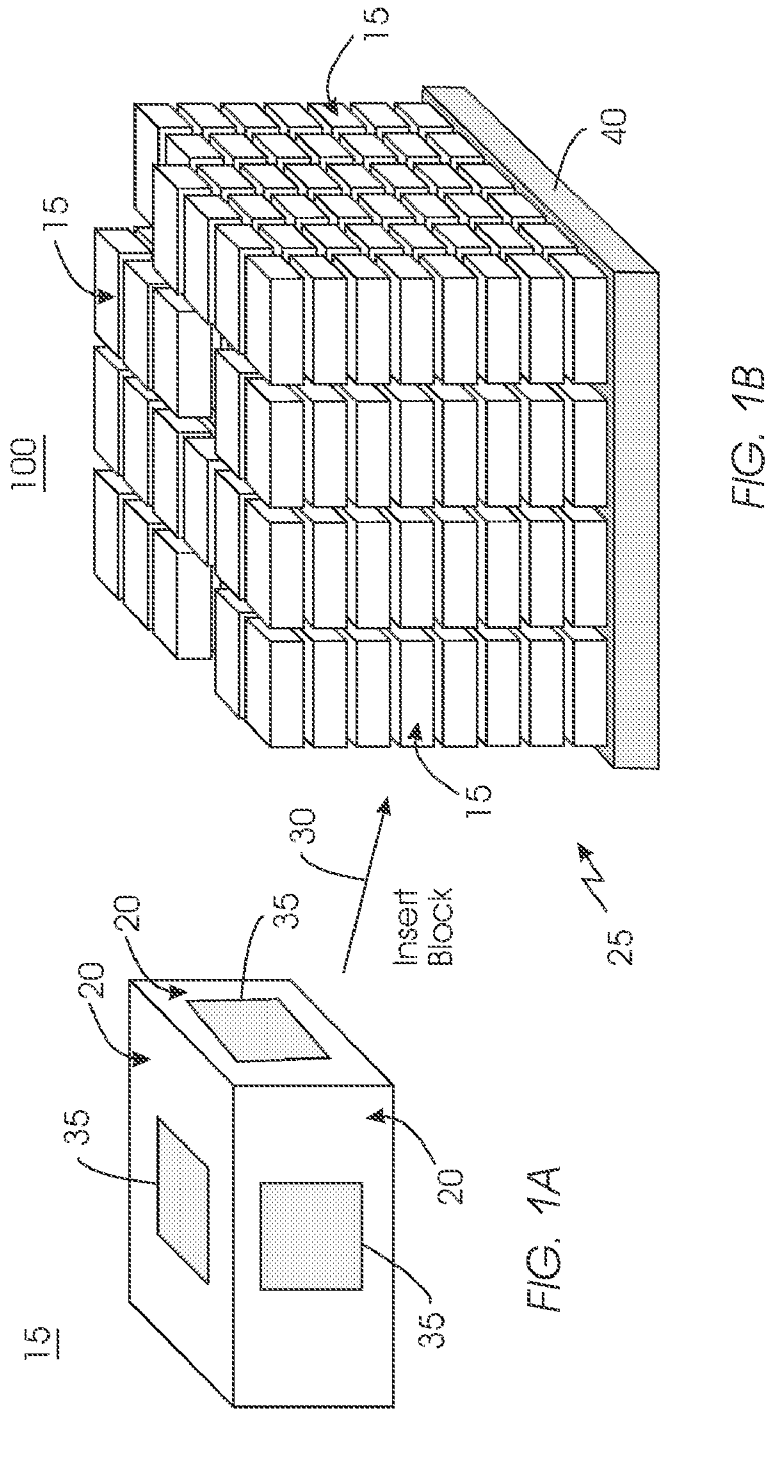
FIG. 1 is comprised of FIGS. 1A and 1B and represents a diagram of an exemplary operating environment or system in which a communications element self-alignment system of the present invention can be used.

FIG. 1 (FIGS. 1A, 1B) portrays an exemplary modular electronic system 100 in which a mechanism for self-alignment of communications elements can be used. The modular electronic system 100 comprises a plurality of generally identical or similar bricks 15 that are collectively referred to as subsystem 25. The bricks 15 are stacked together to form the modular electronic system 100. In this example, each brick 15 has a plurality of contact surfaces 20 that are adapted to be located in close proximity to, or in contact with the contact surfaces of other bricks 15. Arrow 30 illustrates the placement of a brick 15 within the modular electronic system 100.

In this example, each contact surface 20 accommodates a communications element 35. In turn, the communications element 35 may comprise one or more capacitive half-couplers, a transmitter, a receiver, or a transceiver. Each brick 15 comprises a data processing unit (server), a data storage unit, a networking unit, or another computer-related function. Through alignment of adjacent communications elements 35, the subsystem 25 performs the computation or communication functions of the modular electronic system 100 without interconnecting cables and connectors.

The subsystem 25 is positioned on a support base 40 that provides mechanical structural support for the modular electronic system 100 and through which power and cooling liquid are delivered to the subsystem 25.

Contiguous bricks 15 are arranged in close physical proximity to each other, in order to allow communication between the various communications elements 35 of subsystem 25. For illustration purpose, each brick 15 is shown to include six sides or contact surfaces 20. It should be understood that other shapes of the bricks are also possible. For example, the shape of a brick 15 may be a triangular prism (five surfaces), a hexagonal prism (eight surfaces), or a dodecahedron (twelve surfaces).

Figure 2:
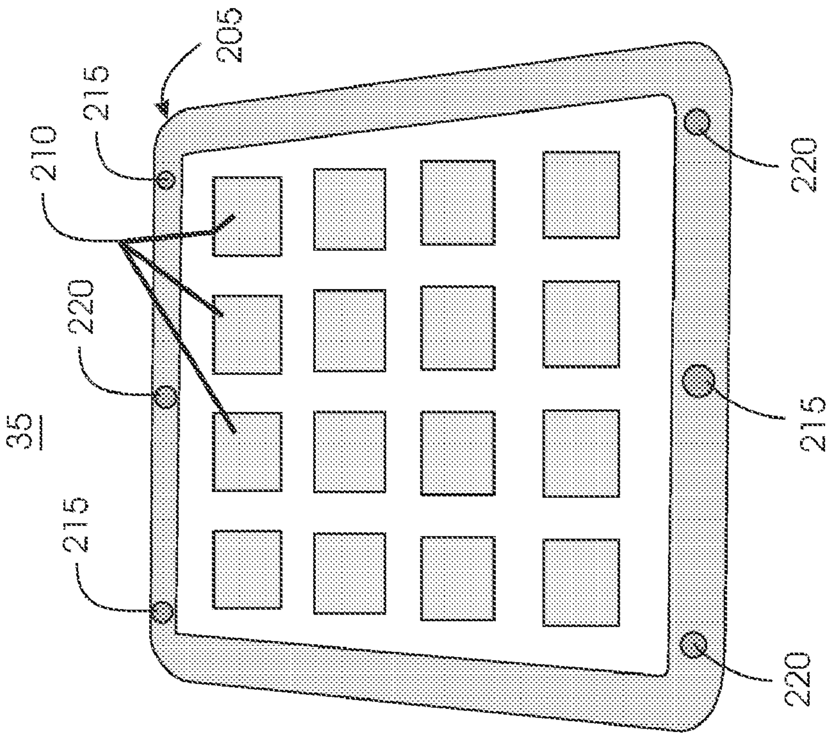
FIG. 2 is a diagram of an exemplary communications element comprising in an alignment frame as used by the communications element self-alignment system of FIG. 1.

FIG. 2 illustrates an exemplary communications element 35 comprising an alignment frame 205 and communication sub-elements or array 210. The alignment frame 205 performs the alignment function of the communications element. In the example of FIG. 2, the communications element 35 comprises an array of communications sub-elements 210 (also collectively referenced as communications array 210).

The alignment frame 205 comprises one or more bumps or raised sections 215 and one or more holes or depressions 220.

When two contiguous communications elements 35 are aligned, the bumps 215 on one communications element 35 of the alignment frame 205 mate with corresponding holes 220 in the alignment frame 205 in the other communications element 35. To this end, bumps 215 and holes 220 are positioned in the alignment frames 205 to precisely align the communications array 210 on adjacent bricks 15.

Figure 3:
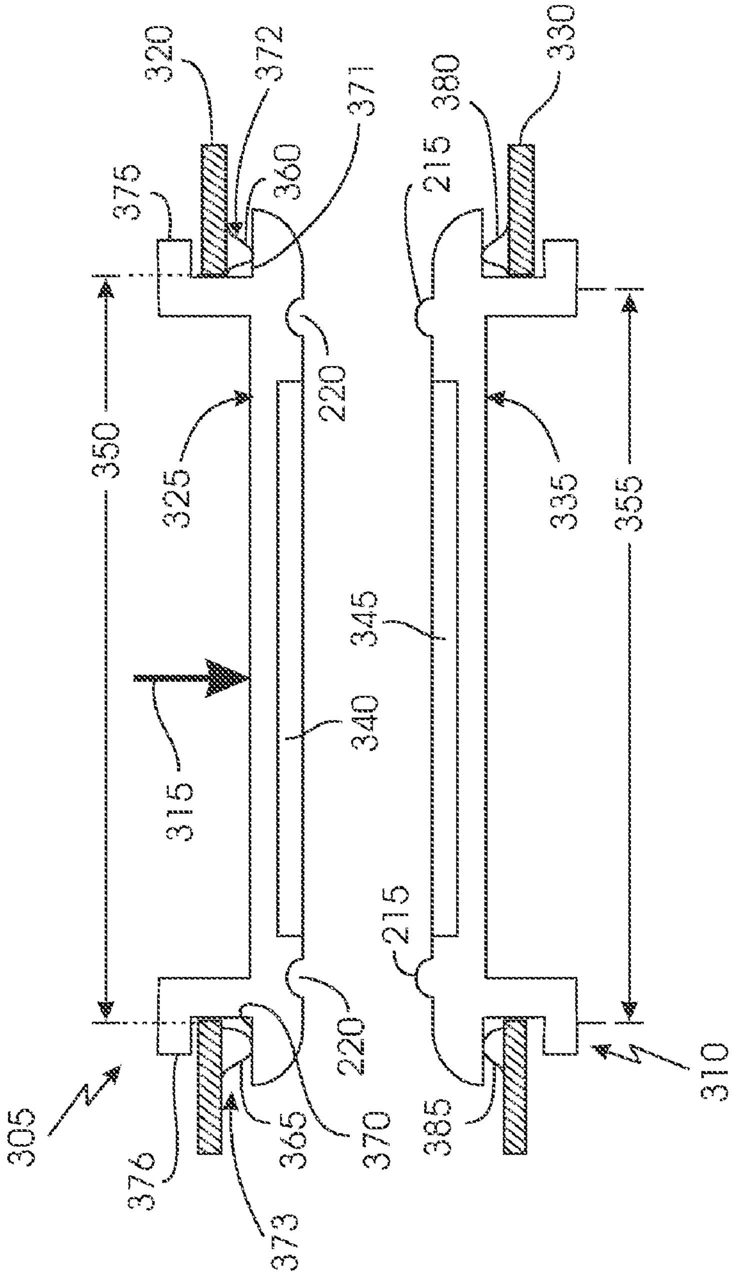
FIG. 3 is a diagram illustrating two communications elements and an associated alignment mechanism as used by the communications element self-alignment system of FIG. 1.

FIG. 3 illustrates the alignment of two bricks 305 and 310 as block 305 is lowered onto block 310 in the direction of arrow 315. Block 305 comprises wall 320 in which an alignment frame 325 is installed. Similarly, block 310 comprises wall 330 in which an alignment frame 335 is installed. The alignment frame 325 comprises bumps 215 (not shown), holes 220, and a communications array 340. The alignment frame 335 comprises bumps 215, holes 220 (not shown), and a communications array 345.

The alignment frame 325 is loosely inserted into a cutout 350 in wall 320. Similarly, the alignment frame 335 is loosely inserted into a cutout 355 in wall 330. The loose fit of alignment frame 325 into wall 320 and the loose fit of alignment frame 335 into wall 330 allow the alignment frames 325 and 335 to slide with respect to each other, allowing the holes 220 and bumps 215 to self align, thereby aligning the communications array 340 and the communications array 345.

Block 305 further comprises a plurality of elastic elements such as leaf springs. In one embodiment, block 305 includes four leaf springs, only two of which, spring 360 and spring 365 are shown. In one embodiment, each of these four springs is preferably positioned at, or near a corner of the alignment frame 325 so as to cause the alignment frame 325 to securely engage the wall 320.

Considering now spring 360 in more detail, it is secured, at one end 372, to the wall 320, and acts against an inner engagement surface 371 of the alignment frame 325. Similarly and symmetrically, spring 365 is secured, at one end 373, to the wall 320, and acts against another inner engagement surface 370 of the alignment frame 325.

Springs 360, 365 force wall 320 against lips 375,376, respectively of the alignment frame 325. Consequently, the alignment frame 325 can slidably move in the cutout 350 with respect to arrow 315, allowing precise alignment of the communications array 340 of block 305 with the communications array 345 of block 310.

Similarly to block 305, block 310 comprises springs 380, 385. Springs 380, 385 act against the alignment frame 335 as described earlier in connection with the function performed by springs 360 370 relative to alignment frame 325.

Figures 4A, 4B:
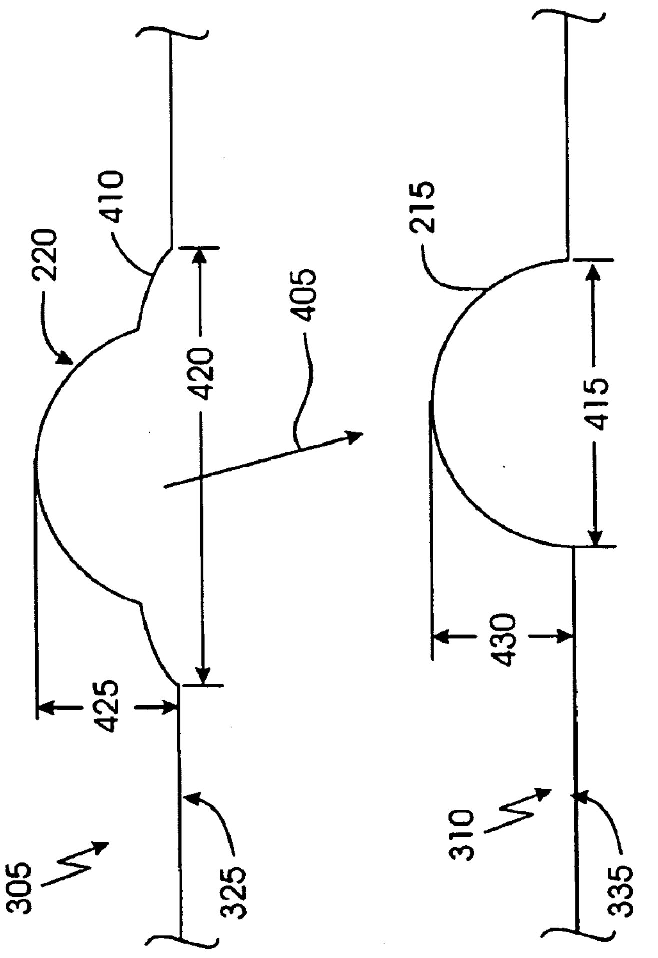
FIG. 4 is comprised of FIGS. 4A and 4B and represents a cross section diagram illustrating an alignment bump and an alignment hole in the alignment frame of FIGS. 1 and 2.

In this example, as block 305 is lowered onto block 310 in the direction of arrow 315, bumps 215 in alignment frame 335 automatically engage the corresponding holes 220 in alignment frame 325. With further reference to FIG. 4, it illustrates an enlarged cross section of an exemplary bump 215 and an exemplary hole 220.

In this illustration, alignment frame 325 is pushed toward alignment frame 335 in the direction of arrow 405. Hole 220 and bump 215 are off-centered. Hole 220 includes an entrance opening 410 that is wider than the diameter 415 of bump 215. The diameter 420 of the entrance opening 410 is determined by the expected accuracy of the alignment of block 305 with block 310. Diameter 420 is sufficiently wide so that bump 215 is guaranteed to intercept hole 220 as block 305 and block 310 are brought in proximity to each other.

The depth 425 of hole 220 is approximately equal to the radius 430 of bump 215. The geometries of hole 220 and bump 215 are generally complementary to assure that bump 215 will enter hole 220 and be centered correctly therewithin, even if bump 215 enters hole 220 off-center.

The alignment frame 325 and the alignment frame 335 are capable of lateral movement (i.e., left and right), to accommodate the tolerances as bump 215 enters hole 220. The alignment frame 325 and the alignment frame 335 are concurrently pushed back against their respective leaf springs 360, 365, 380, and 385.

Figure 5:
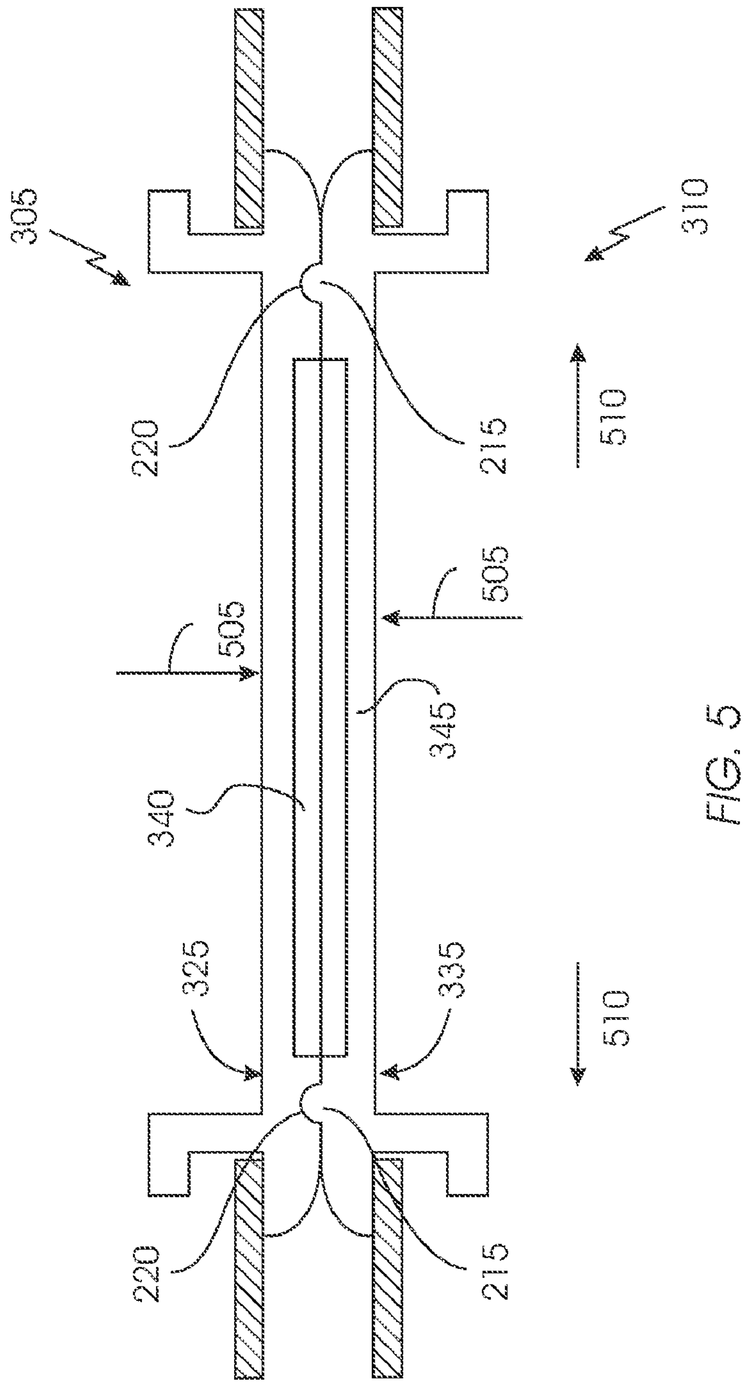
FIG. 5 is a diagram illustrating two alignment frames in resting position after alignment by the alignment process of the communications element self-alignment system of FIG. 1.

FIG. 5 illustrates block 305 and block 310 in an aligned, resting position. Holes 220 and bumps 215 of the alignment frames 325 and 335, respectively engage each other automatically. The communications array 340 is precisely aligned with the communications array 345 with respect to a vertical dimension 505 and a horizontal dimension 510.

Figure 6:
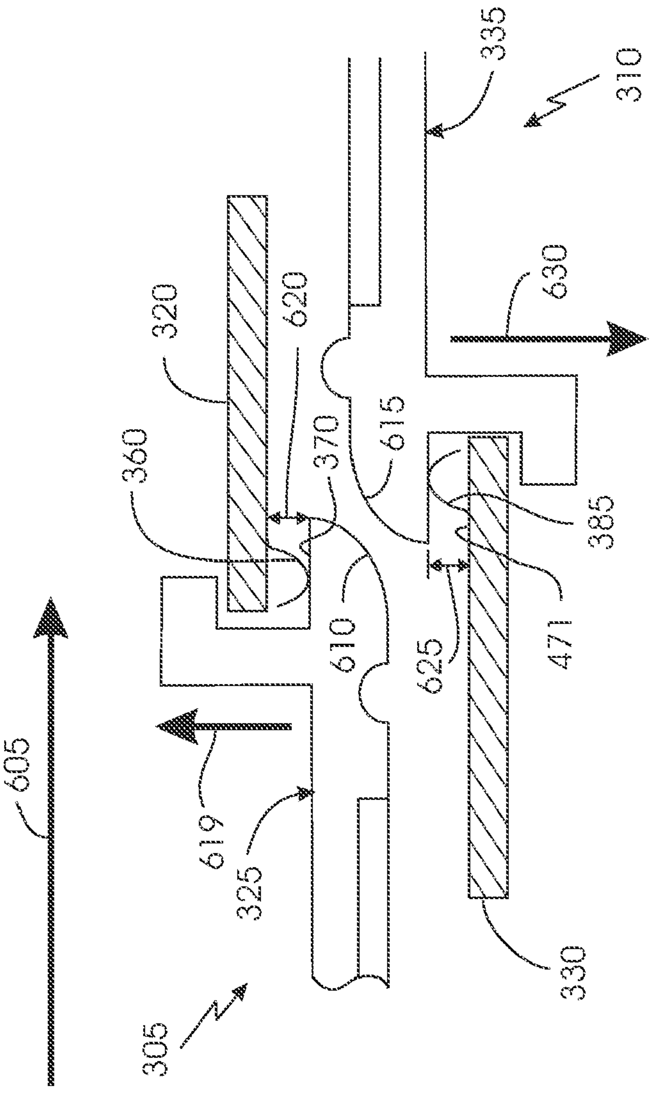
FIG. 6 is a diagram illustrating two alignment frames sliding towards each other prior to physical contact between the two alignment frames during the alignment process of the communications element self-alignment system of FIG. 1.

FIG. 6 illustrates the alignment frame 325 and the alignment frame 335 when block 305 is inserted into the modular electronic system 100 along a horizontal direction represented by arrow 605, by sliding block 305 over block 310. The alignment situation of FIG. 6 can occur, for example, when block 305 is being inserted vertically into an existing hole in the modular electronic system 100 between bricks 15 that have already been installed. The alignment frame 325 comprises an alignment guide such as an arcuate or rounded edge 610. Similarly, the alignment frame 330 comprises an alignment guide such as an arcuate or rounded edge 615.

Pushing edge 610 against edge 615 forces the alignment frame 325 upward, along vertical direction 619, toward wall 320. The push force is absorbed by spring 360 causing it to deflect so that the separation 620 between wall 320 and inner engagement surface 370 of the alignment frame 325 is reduced. Separation 620 is of sufficient value that edge 610 and edge 615 make contact as block 310 is horizontally inserted into the modular electronic system 100.

Similarly, the alignment frame 335 is forced along an opposite vertical direction 630, pushing against spring 385. The push force is absorbed by spring 385 causing it to deflect so that the separation 625 between wall 330 and inner engagement surface 471 of alignment frame 335 is reduced. Separation 625 is of sufficient value that edge 610 and edge 615 make contact as block 310 is horizontally inserted into the modular electronic system 100.

Figure 7:
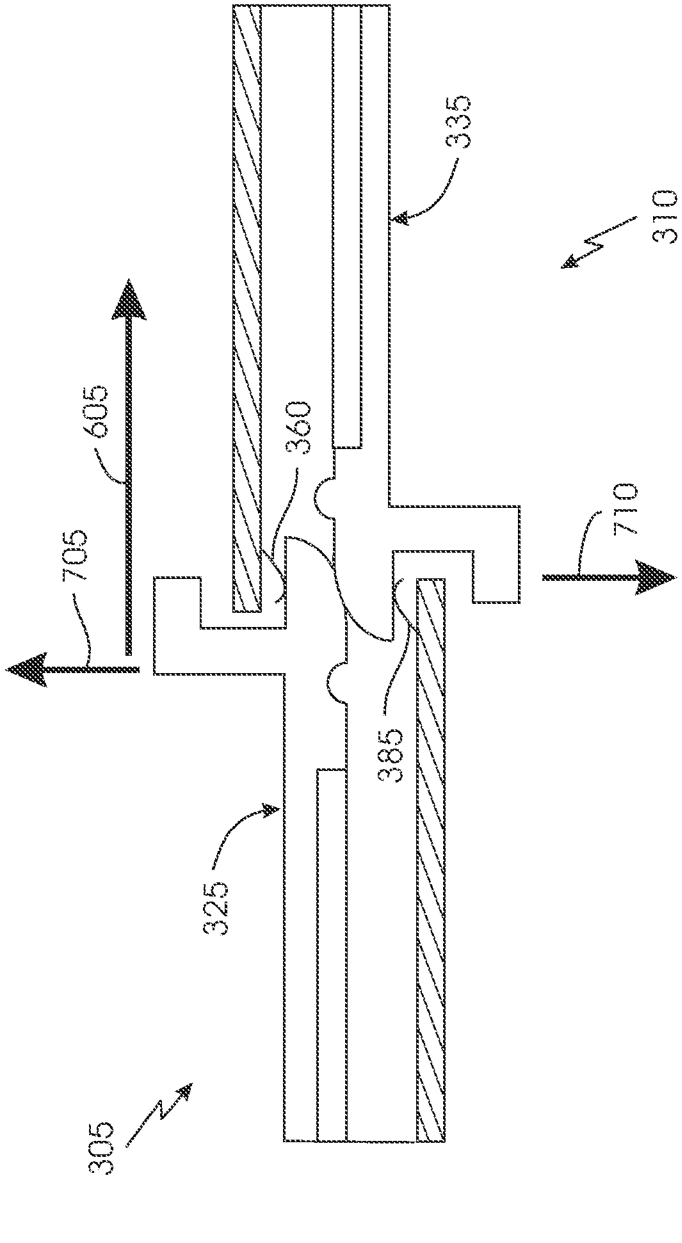
FIG. 7 is a diagram illustrating two alignment frames after initial physical contact during the alignment process of the communications element self-alignment system of FIG. 1.
Figure 8:
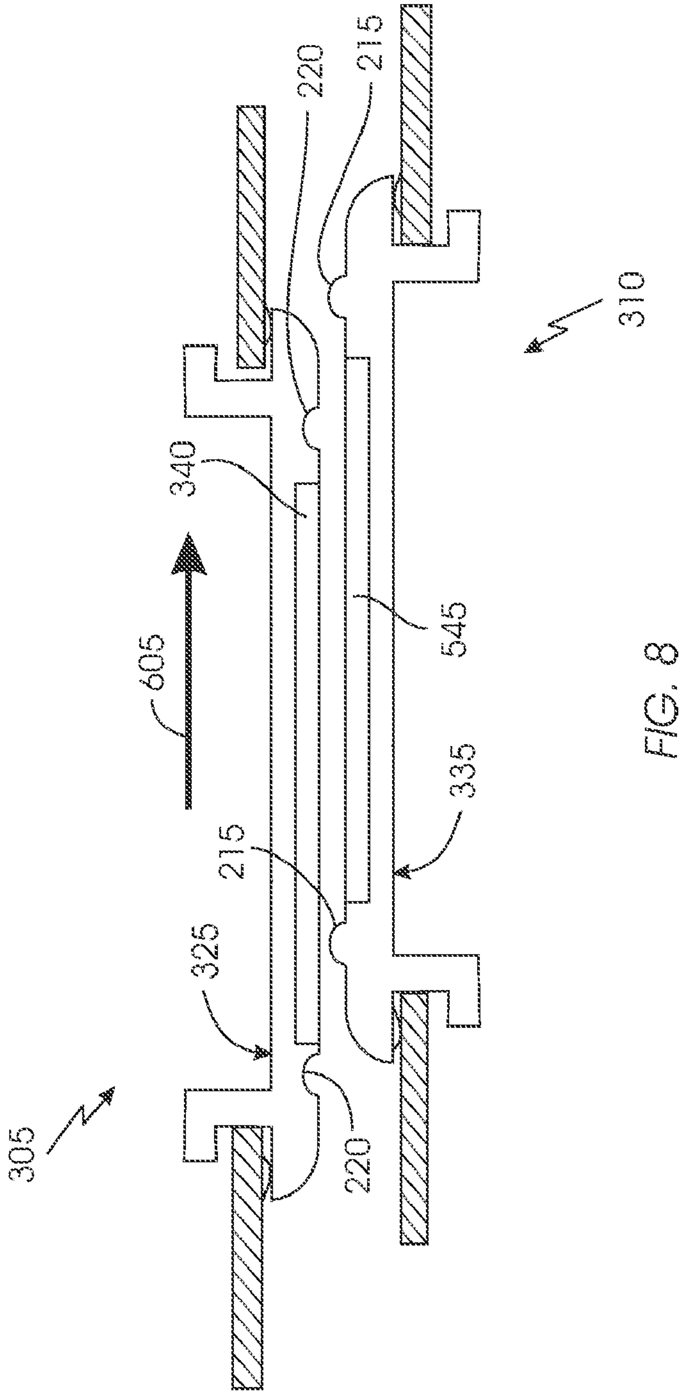
FIG. 8 is a diagram illustrating two alignment frames prior to initial contact.

FIG. 7 illustrates alignment frame 325 and alignment frame 335 after initial contact. FIG. 8 illustrates alignment frame 325 and alignment frame 335 before initial contact. Initial contact occurs as block 305 is inserted into the modular electronic system 100 along horizontal direction 605 by sliding block 305 over block 310. As alignment frame 325 is pushed against alignment frame 335, alignment frame 325 pushes against the force of spring 360, temporarily moving the alignment frame 325 into block 305 in a vertical direction illustrated by arrow 705. Similarly, as alignment frame 325 is pushed against alignment frame 335, alignment frame 335 pushes against the force of spring 385, temporarily moving the alignment frame 335 into block 310 in a direction illustrated by arrow 710.

It is to be understood that the specific embodiments of the invention that have been described are merely illustrative of certain applications of the principle of the present invention. Numerous modifications may be made to the system and method for self-alignment of communications elements in a modular electronic system described herein without departing from the spirit and scope of the present invention. Moreover, while the present invention is described for illustration purpose only in relation to a modular electronic system, the present invention may be used by any system in which precision alignment between elements is required.

What is claimed is:

1. A mechanism for automatically aligning a first and a second communications elements in an electronic system, comprising:

a first alignment frame that comprises at least two depressions, two bumps, and a first alignment guide and that is disposed on one side of the first communication element;

a second alignment frame that comprises at least two depressions, two bumps, and a second alignment guide and that is disposed on one side of the second communication element; and wherein the first and second communication elements are aligned by bringing the first and second alignment frames into engagement and by causing the first and second alignment guides to slide past each other, to guide the bump in the first alignment frame into the depression in the second alignment frame and to further guide the bump in the second alignment frame into the depression in the first alignment frame.

2. The mechanism of claim 1, wherein each of the first and second alignment frames comprises a plurality of bumps and depressions; and wherein the plurality of bumps and depressions are disposed in a complementary mating arrangement.

3. The mechanism of claim 2, wherein the electronic system comprises a modular electronic system that comprises a plurality of bricks; and wherein each brick is provided with a communication element that enables the bricks to exchange data.

4. The mechanism of claim 3, wherein the electronic system comprises a first brick having a wall that includes a first cutout for accommodating the first alignment frame; and wherein the electronic system comprises a second brick having a wall that includes a second cutout for accommodating the second alignment frame.

5. The mechanism of claim 4, wherein the first cutout is slightly larger than the first alignment frame to provide the first alignment frame with a freedom of movement within the first cutout; and wherein the second cutout is slightly larger than the second alignment frame to provide the second alignment frame with a freedom of movement within the second cutout, in order to reflect a predetermined alignment tolerance.

6. The mechanism of claim 5, wherein the first alignment frame further comprises a lip for retaining the first alignment frame within the first cutout; and wherein the second alignment frame further comprises a lip for retaining the second alignment frame within the second cutout.

7. The mechanism of claim 6, wherein the first alignment frame comprises a first elastic element that forces the first alignment frame against the first wall; and wherein the second alignment frame comprises a second elastic element that forces the second alignment frame against the second wall.

8. The mechanism of claim 1, wherein each depression of the first and second alignment frames comprises an entrance opening that is wider than a diameter of a corresponding bump.

9. The mechanism of claim 8, wherein the entrance opening has a diameter that is wider than the diameter of the corresponding bump, in order to allow the depressions of the first and second alignment frames to intercept corresponding bumps of the first and second alignment frames.

10. The mechanism of claim 1, wherein the first alignment guide comprises an arcuate edge;

wherein the second alignment guide comprises an arcuate edge; and wherein upon brining the first and second alignment frames into contact with each other, the arcuate edge of the first alignment guide rides and smoothly slides on, and then past the arcuate edge of the second alignment guide.

* * * * *